United States Patent
Collard

(10) Patent No.: US 6,813,037 B1
(45) Date of Patent: Nov. 2, 2004

(54) MANIPULATION OF ENERGY CONSERVATION IN IMAGE FORMING DEVICES IN A NETWORK SYSTEM

(75) Inventor: René François Albert Collard, Gennep (NL)

(73) Assignee: Océ-Technologies B.V., Venlo (NL)

(*) Notice: Subject to any disclaimer, the term of this patent is extended or adjusted under 35 U.S.C. 154(b) by 0 days.

(21) Appl. No.: 09/369,315

(22) Filed: Aug. 6, 1999

(30) Foreign Application Priority Data

Aug. 7, 1998 (NL) .............................................. 1009817
Aug. 4, 1999 (EP) ............................................. 99202544

(51) Int. Cl.⁷ .............................................. G06F 15/00
(52) U.S. Cl. ........................ 358/1.15; 358/1.9; 358/1.5; 358/402
(58) Field of Search ........................ 358/1.5, 1.9, 1.15, 358/402; 399/38

(56) References Cited

U.S. PATENT DOCUMENTS

| | | | | |
|---|---|---|---|---|
| 5,528,346 A | * | 6/1996 | Kim et al. ..................... | 399/33 |
| 5,636,332 A | | 6/1997 | Hibino | |
| 5,803,623 A | * | 9/1998 | Iwasaki ........................ | 400/54 |
| 5,933,581 A | * | 8/1999 | Miyazaki et al. ........... | 358/1.14 |
| 5,937,148 A | * | 8/1999 | Okazawa ................... | 358/1.13 |
| 5,987,225 A | * | 11/1999 | Okano ....................... | 358/1.13 |
| 6,065,123 A | * | 5/2000 | Chou et al. ................. | 713/322 |
| 6,091,515 A | * | 7/2000 | Kimura ...................... | 358/434 |
| 6,134,019 A | * | 10/2000 | Wantuck et al. ........... | 358/1.15 |
| 6,268,925 B1 | * | 7/2001 | Yamanaka ................. | 358/1.14 |

FOREIGN PATENT DOCUMENTS

EP 0398648 A2 11/1990
EP 0599523 A2 6/1994

OTHER PUBLICATIONS

Patent Abstracts of Japan, vol. 011, No. 383 (P–646) Dec. 15, 1987.
Patent Abstracts of Japan, vol. 004, No. 142 (P–030) Oct. 07, 1980.
Patent Abstracts of Japan, vol. 012, No. 347 (M–743) Sep. 19, 1988.

* cited by examiner

Primary Examiner—Edward Coles
Assistant Examiner—Chan S. Park
(74) Attorney, Agent, or Firm—Birch, Stewart, Kolasch & Birch, LLP

(57) ABSTRACT

In a system having at least one workstation, at least one image reproduction device, such as a copying machine or a printer, and a digital network to which the workstation and the image reproduction device are connected, the workstation is provided with a control program for communication with the image reproduction device, in order to call up or receive information from the image reproduction device concerning the status thereof, and for displaying current status information as to the image reproduction device on the workstation display screen. This control program detects that the image reproduction device is in an energy conservation mode, and is adapted to display this information on the workstation display screen as well. The control program in the workstation causes the image reproduction device to return to the normal state of operation when it is in an energy conservation mode, on a command from the workstation operator, and causes the image reproduction device to pass from the normal operating mode into an energy conservation mode, again on the command of an operator of the workstation.

34 Claims, 7 Drawing Sheets

MANIPULATION OF ENERGY CONSERVATION IN IMAGE FORMING DEVICES IN A NETWORK SYSTEM

BACKGROUND OF THE INVENTION

1. Technical Field of the Invention

The invention relates to a system including a workstation provided with a processor unit, a display screen and an operator control device such as a keyboard and a mouse; an image reproduction device provided with a control unit and a network connection unit; a digital network to which the workstation and the image reproduction device are connected, in which system the workstation is provided with a control program for communication with the image reproduction device, in order to call up or receive information from the image reproduction device concerning the status thereof, and for displaying current status information concerning the image reproduction device on the workstation display screen.

2. Description of Related Art

A system of this kind is known from EP-A 0 398 648. In this known system, the status of application programs, including a printer application, is displayed on the workstation monitor screen by means of icons. When the status of an application changes, the icon of that application is adapted dynamically, in that system by the addition of another icon.

In applicants' Netherlands Patent Application No. 1008659, status indication of a device connected to the network is extended to digital copying machines which also have a copying function. It is desirable for users to be able to determine at their workplace (at their workstation) whether a device that they wish to use is ready for use. In the latter Application a distinction is made between the following modes: ready for use, occupied with a print job, occupied with an operator at the device, and malfunction.

In the context of energy conservation steps, modern copying machines and printers are increasingly provided with a control system which, after expiry of a predetermined period during which the device is not in use, automatically brings the device into a mode in which the energy consumption is low. In this mode, for example, a fixing unit required for fusing toner powder on receiving sheets is brought to a lower temperature than normal or even completely switched off so that the heat loss is restricted.

If a device is in an energy conservation mode of this kind, frequently referred to as sleep mode, it takes some time to return to the normal operating mode, e.g. because the fixing unit first has to come back to operating temperature.

Usually, the energy conservation mode continues to automatically operate until detection of an action by an operator at the device or upon arrival of a print job, but the device is in that case not immediately ready for use.

A user who proceeds to a device in order to carry out a job there, e.g. a copying job, will therefore have to wait there until the device has returned to the normal operating mode, and this causes loss of time and annoyance.

Another conventional system, U.S. Pat. No. 5,636,332 (Hibino), discloses a system formed by a computer and a printer connected to the computer, both of which have a sleep mode. When the computer enters the sleep mode, the printer follows automatically. In sleep mode, the computer display is dimmed and only shows a wake-up menu for the complete system. The computer user can also set the sleep mode for only the printer by using a pop-up menu on the computer display. In that case, the user has no indication that the printer is in sleep mode and may still be obliged to wait for the printer to get ready for printing. This is a nuisance for the printer user, who stays behind his workstation and is even less acceptable for a user who walks up to a device for running a job there, but is stymied by a printer that is not ready for immediate use.

SUMMARY OF THE INVENTION

The object of the invention is to alleviate the disadvantages of the known system and, to this end, according to the invention, the control program in the workstation detects that the image reproduction device is in an energy conservation mode and is adapted to display this information on the workstation display screen.

In this way, when a user sees on his workstation monitor screen that a device is in an energy conservation mode he can decide to use another device which is not in that mode, or wait until the device has returned to the normal operating mode for some reason, before he proceeds there for his copying job.

The user's convenience can be further enhanced by adding the step in which the control program in the workstation returns the image reproduction device into the normal operating mode when the device is in the energy conservation mode and receives, from the workstation operator control device, a command for returning the image reproduction device to the normal operating mode.

Consequently, the user can from his workplace wake up the device from the energy conservation mode, wait until it is again in the operating mode, this being shown by the latter mode also being displayed on the display screen, and not proceed to the device before then.

The display on the workstation display screen is, for example, in the form of a symbolic image of the mode of the device or icon, while an illustration of a key that can be actuated with the mouse can also be used to give the wake-up command.

In another embodiment, the control program in the workstation determines how long it will take to bring the image reproduction device back to the normal operating mode from an energy conservation mode in which it is at that time, and is adapted to display this information on the workstation display screen.

This information can also be updated dynamically on the screen.

In another embodiment, the control program in the workstation causes the image reproduction device to pass into the energy conservation mode when it is in the normal operating mode and receives from the workstation operator control device a command for causing the image reproduction device to pass into the energy conservation mode.

In this way it is also possible immediately to bring into the energy conservation mode a device that the user knows will not be used for the time being, i.e. without waiting until the automatic system in the device does this. This gives an extra contribution to energy conservation.

The devices connected to the network may be copying machines, digital copying machines (suitable for use as a scanner, printer and copying machine) and printers. All these devices should be equipped with a connecting unit for connection to the network in order to communicate as to their status. The network connection unit is also used in printers and digital copying machines for the transport of image data.

The invention also relates to a method applied in the above-described system.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF DRAWINGS

The present invention will become more fully understood from the detailed description given hereinbelow and the accompanying drawings which are given by way of illustration only, and thus are not limitative of the present invention, and wherein.

DETAILED DESCRIPTION OF PREFERRED EMBODIMENTS

Figure 1:
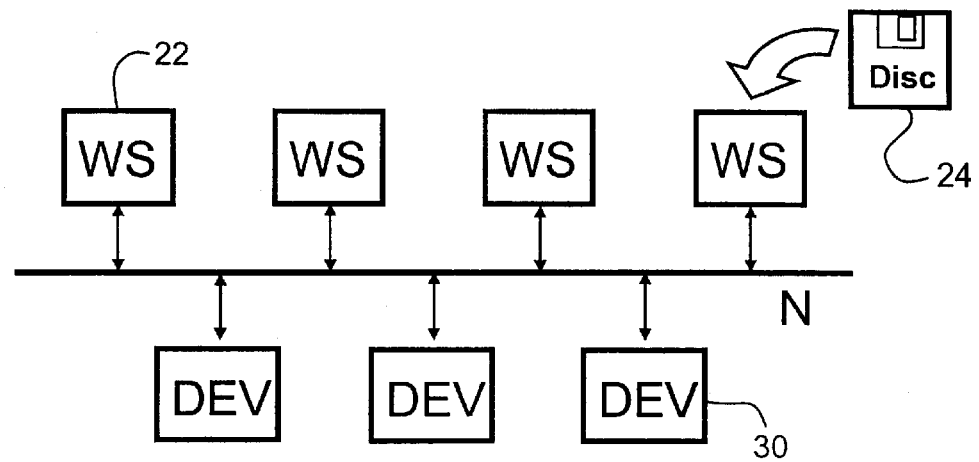
FIG. 1 shows a system in which the invention is used.

FIG. 1 illustrates a system of workstations 22 (WS) and image-forming devices 30 (DEV), connected by a local network N. The workstations are, for example, PC's and are in each case equipped with a processor unit, a monitor, a keyboard and a mouse or other indicator instrument. The image-forming devices are, for example, copying machines, printers, or digital copying machines. A digital copying machine includes a scanner, a printer, an operator control unit and a connection unit (Digital Access Controller or DAC) for connection to the network and for processing print jobs sent from the workstations. The ordinary copying machines, i.e. those which do not operate as a printer, and the printers are at least provided with a DAC and a control system adapted to the functionality described hereinafter, the DAC of an ordinary copying machine only having the function of communicating the state of the device. All these devices, (digital) copying machines and printers, are hereinafter referred to as "devices". Users who wish to have a specific data file printed from their workstation can, for this purpose, make a selection from a number of, or even all the, printers and digital copying machines of the system.

Figure 2:
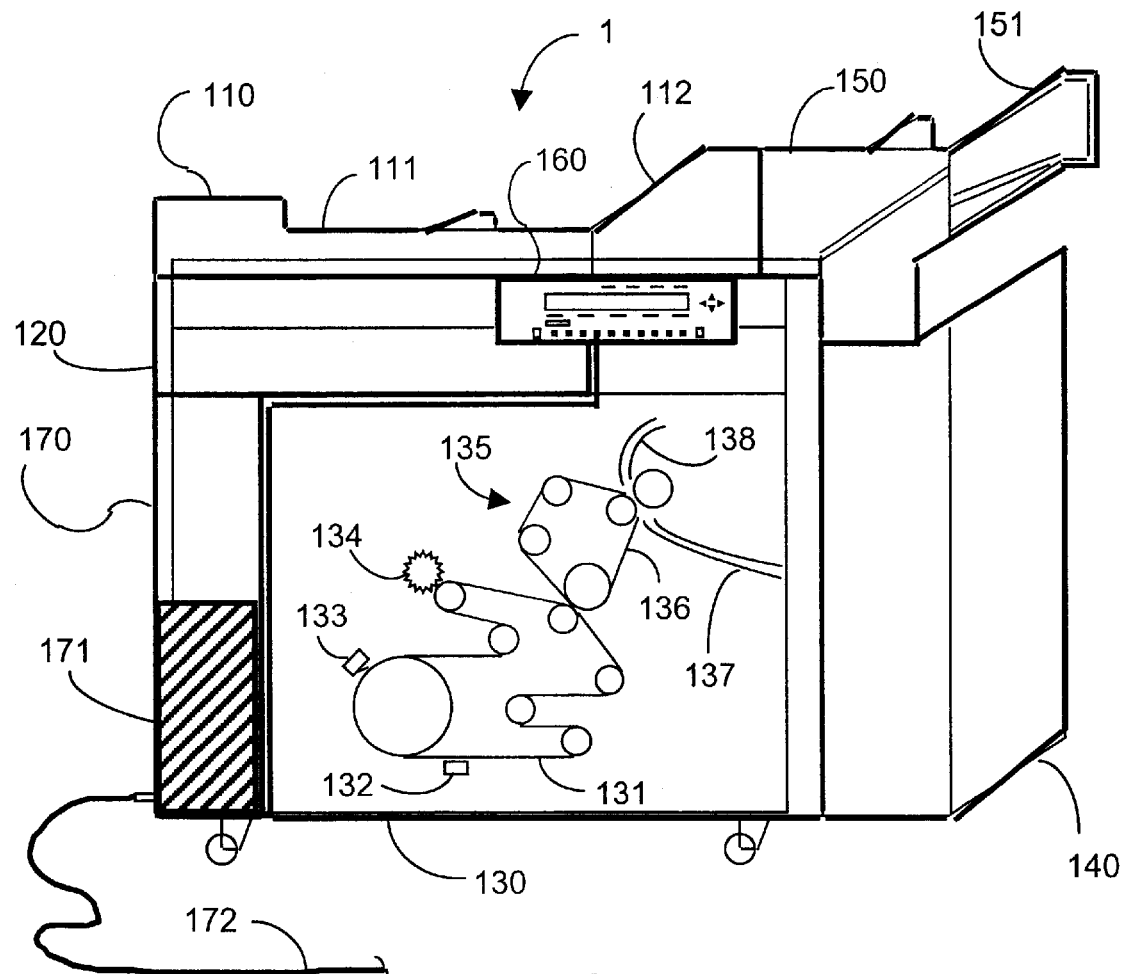
FIG. 2 is an illustration of a digital copying machine in which the invention is used.

As an example, FIG. 2 shows a representation of a digital copying machine 1 suitable for use in the system, the various parts being shown diagrammatically and separately. These parts include a document feeder 110 for physically handling documents for copying, a scanner unit 112 for generating digital image data corresponding to an image occurring on a document, a printer unit 130 for making prints of images on image supports in accordance with digital image data, a supply unit 140 and a processing and output section 150 for image supports, an operator control panel 160, a control unit 170 and a network connection unit 171.

The document feeder 110 is provided with a tray 111 to receive a stack of documents, a transport mechanism (not shown) for transporting the documents one by one along the scanner unit 120, and an output tray 112, in which the documents are deposited after scanning.

The scanner unit 120 includes a flat bed scanner provided with a glass plate on which an original document can be placed, a CCD array and an imaging unit having a movable mirror and lens system for imaging the document on the CCD array. In these conditions the CCD array generates electrical signals which are converted to digital image data in manner known per se.

The printer unit 130 includes an electrophotographic processing section known per se, in which a photoconductive medium 130 in belt form is charged with a corona unit 132 and then exposed with an LED array 133 in accordance with digital image data. The charge image thus formed on the medium 131 is developed in a developing unit 134 with toner powder, whereafter the latter is transferred to a heated rubber belt 136 in a combined transfer and fixing unit 135. On this belt 136 the toner powder softens as a result of the heat of the belt 136 and becomes sticky. It is then transferred to and fixed on an image support, usually a sheet of paper, which is fed from a supply section 140 via a transport path 137.

A stock of image supports in various formats and orientations is available in the supply unit 140.

The image supports with toner image are transported via a transport path 138 to the finishing and output section 150, which if necessary collects them into sets and staples them and then deposits them in the delivery tray 151.

The operator control panel 160 is intended for the operator's control of the device. It is provided with a display and keys and is connected to an operator control unit (not shown here), which is in turn connected to the control unit 170 and the network connection unit 171.

The control unit of the device 1 is shown diagrammatically by reference 170. It includes at least one microprocessor, a memory and suitable hardware circuits, and contains modules for controlling the units 110, 120, 130, 140 and 150 and an image processing module for so processing the digital image data that prints of good image quality can be made by the printer unit 130. The device as already stated also includes a network connection unit (Digital Access Controller or DAC) 171 for connection to a local network 10 shown diagrammatically here in the form of a cable 172.

In order to prevent unnecessary energy consumption, the devices of the system are provided with facilities for selectively switching off parts of the device if no use is made thereof for a specific time. A device then passes to the sleep mode, in which only vital parts of the system remain active. It is characteristic of the sleep mode that large energy loads in a device are switched off or at least switched to a mode having a lower consumption. In electrophotographic devices, it is the fixing unit in which toner powder is fused on a sheet of paper that is usually the largest energy load. A considerable energy conservation can therefore be obtained by bringing this unit to a lower temperature or even switching it completely off. The result of that, however, is that it requires some time to make the device ready for operation again, because heating up the fixing unit takes time.

As an example, these facilities as implemented in the above-described digital copying machine will now be described in detail with reference to FIG. 3.

The digital copying machine includes two sub-systems which are independent in control terms, namely on the one hand the network connection unit (DAC) 171 and on the other hand all the other parts, as shown in FIG. 2, which will hereinafter be collectively referred to by the term "engine". These two sub-systems each have their own control unit, here respectively termed DAC 40 and engine controller 50. Between the two control units there is a connection over which the DAC passes commands to the engine controller and vice versa, and over which the engine controller and the DAC exchange data concerning their status.

In this example, the engine controller recognizes a normal operating mode (stand-by 60) in which the engine is ready to make prints and two different modes for energy conservation, a first sleep mode 1 (62) and a second sleep mode 2 (64). The engine controller also recognizes a mode in which prints are made ("printing jobs" 65) and a mode in which the engine returns from the second sleep mode to the stand-by mode ("warming up" 66).

The first sleep mode is entered when the engine has been in the stand-by mode for a predetermined period without one of the engine parts having had to perform any activity. This is indicated by the term "time-out 1" in FIG. 3.

In the first sleep mode, a limited energy conservation is obtained by setting the fixing unit 135 to a lower temperature and isolating it thermally from its surroundings completely, and in addition a part of the control system is switched off, except for a memory section in which parameters and initialization values are stored. The result of this is that on the return from the first sleep mode to the stand-by mode the control system is immediately ready for use. Generally the return to the stand-by mode from the first sleep mode takes only a little time (a few seconds).

The engine controller returns from the first sleep mode to the stand-by mode on detecting a predetermined event (event 1). Examples of such an event are actuation of one of the keys or other operator control inputs of the device and the delivery by the DAC 171 of a signal to the effect that is has received a print job via the network.

The second sleep mode is entered when the engine has been in the first sleep mode for a predetermined time without one of the engine parts having had to perform any activity. This is indicated by the term "time-out 2" in FIG. 3.

In the second sleep mode, a considerable energy saving is obtained by practically the entire engine now being switched off, except for a small part of the engine controller required to receive a command to leave the sleep mode and restore the engine to the stand-by mode. In this case, the return to the stand-by mode takes considerably more time, because the fixing unit now has to be completely warmed up and a number of initializations of control systems have to be carried out. The engine does not therefore immediately return to the stand-by mode but via an intermediate warming-up mode.

The engine controller returns from the second sleep mode to the stand-by mode on detection of a predetermined event (event 2). Examples of such an event are actuation of one of the keys or other operator control inputs of the device and the delivery by the DAC 171 of a signal to the effect that it has received a print job via the network.

In an alternative embodiment, the engine is completely switched off in the second sleep mode, including the engine controller (with the exception of a small section for communication with the DAC). In that case, the engine controller and the engine can be activated only by someone actuating the ON switch on the device or by the DAC activating a hardware circuit which again applies mains voltage to the engine, this being termed "event 2" in FIG. 3.

The DAC 171 has no separate energy conservation mode.

If the DAC 171 does not have to perform any tasks, it passes into an inactive mode 68 ("idle"). If a print job now arrives via the network, the DAC checks the status of the engine and if necessary gives a command to pass to the stand-by mode 70. When the engine is in this mode or has reached it, the DAC rasterizes the digital data of the print job 72 and passes the same to the engine, which prints them on image supports.

In an alternative embodiment, the DAC also can be provided with an energy conservation mode. In practice, the DAC is a personal computer programmed for its tasks, and energy conservation steps are also developed for such devices. In this case the engine controller can wake up the DAC from this mode if the DAC is necessary to perform a job, e.g. an interactive print job (to be described hereinafter). The implementation of this would be a routine matter to one of ordinary skill in the art in the light of the above description and will therefore not be described separately.

The implementation of energy conservation steps in devices other than the digital copying machine described above is completely identical and is therefore not described in detail.

The means whereby the users of workstations WS (FIG. 1) can communicate with the connected devices (DV) will now be described in detail with reference to FIG. 4.

A program hereinafter referred to by the term "desktop software" is active in each connected workstation for the purpose of communication with the devices and the presentation of information concerning the same to the users. This program is personalized, i.e., it operates on the instructions of one user who has identified himself at the start and has input his authorization code.

The inventive program disclosed herein may take the form of an article of manufacture. More specifically, the article of manufacture is a computer-usable medium, including a computer-readable program code embodied therein wherein the computer-readable code causes computer workstation WS to execute the inventive method. A computer diskette such as disc 24 shown in FIG. 1 is an example of such a computer-usable medium. When the disc is loaded into the workstation WS, the computer-readable program code stored therein is transferred into the workstation WS. In this way, the workstation WS may be instructed to perform the inventive methods disclosed herein.

The desktop software, hereinafter also referred to as "desktop" for short, is built up from a number of sub-programs, shown diagrammatically in block 100 in FIG. 4. The core of the desktop software is formed by a sub-program indicated by "virtual printer" (VP), which communicates with the connected devices and which updates properties and status of each thereof insofar as it is of interest to the workstation user. As will be explained in the following description, a user can choose how much information he wishes to have presented concerning the state of connected devices and the print files to be processed thereon, and at what time. The exchange of data concerning these matters between the desktop software and the devices is limited to what is necessary for the user's wishes. This prevents the network from being overloaded and the processing capacity of the station is also not loaded more than necessary, since only the relevant information is present in the workstation and requires processing.

The "virtual printer" program is provided with an operator control program, hereinafter referred to as "user interface" (UI), which controls the communication between the user and the desktop software in a manner understandable to the user, in the form of keystrokes on the keyboard and windows on the monitor screen, in which information is presented and in which the user can select and actuate elements using mouse movements. The desktop software is also provided with a communication program COM for controlling data transport from and to the devices via the network N.

Figure 4:
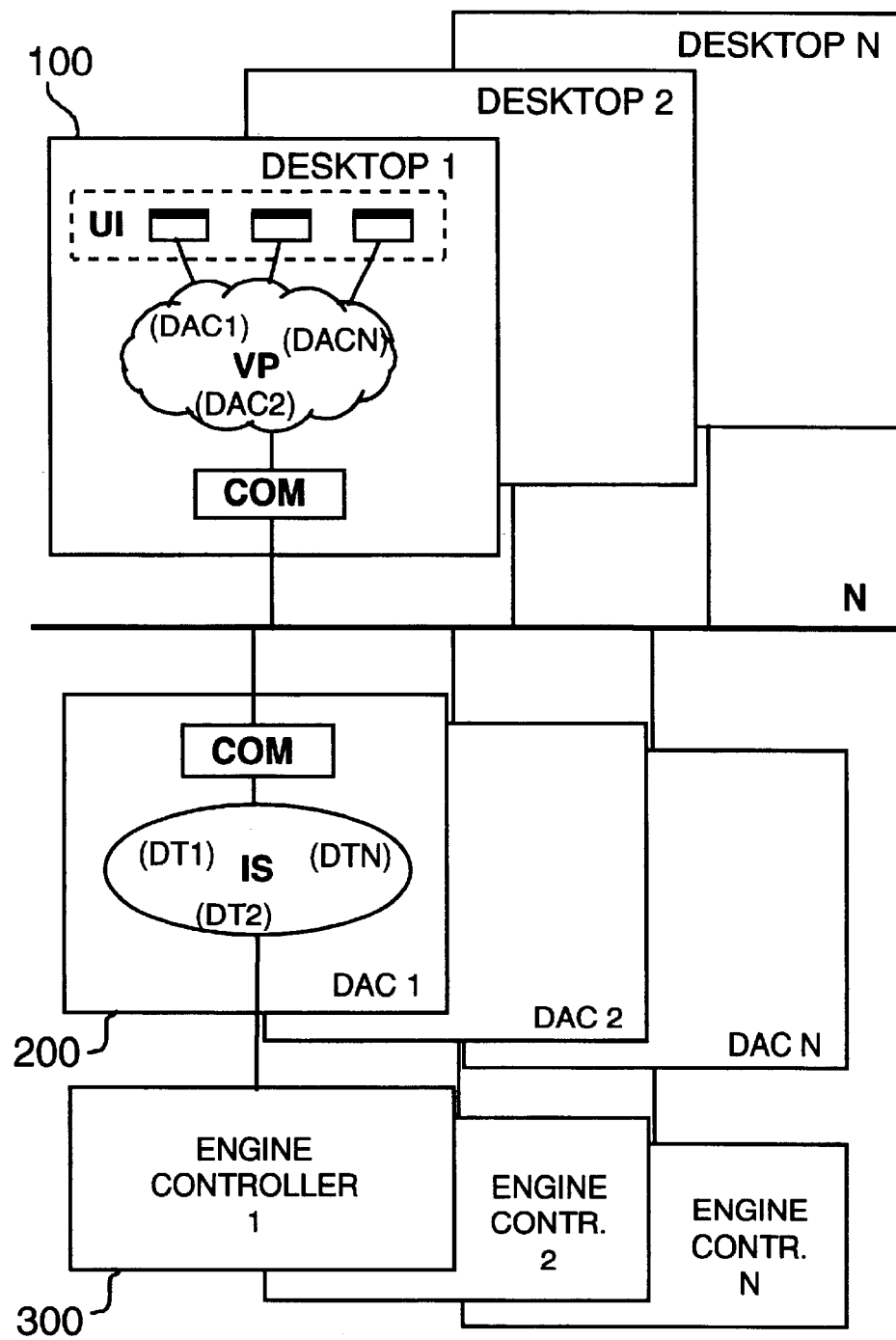
FIG. 4 is a diagram showing the relationship of the desktop software and controllers in the devices.

Block 200 of FIG. 4 shows a diagrammatic layout of the communication software in the DACs of the devices. This is formed primarily by an information server (IS) which is intended to receive digital information from and send it to workstations, such digital information for example being status information concerning the device itself and concerning the print jobs that the device is processing. The information server maintains data concerning the information required by each desktop (DT) and transmits only that information which is really wanted, and at the time at which it is wanted. The information server is also provided with a communication program COM for controlling data transport from and to the desktop via the network N.

As described with reference to FIG. 2, the DAC is connected to the engine controller of the associated engine. This is shown diagrammatically in the form of block 300. DAC 200 and engine controller 300 together form the part of a device which is relevant to the invention.

Files of digital data which are transmitted via the network to a printer or digital copying machine for printing by the same are either of a first type or of a second type. Files of the first type, hereinafter referred to as automatic print jobs, are required to be printed immediately, i.e. without further action on the part of an operator at the device, while files of the second type, hereinafter referred to as interactive print jobs, only have to be stored in the memory of the device and do not have to be printed until an operator at the machine explicitly so requests by selection using the operator control panel. An attribute added to the file shows the type to which it belongs.

The processing of a data file of the first type is hereinafter referred to in this description as automatic printing (AP).

The processing of a data file of the second type is hereinafter referred to as interactive printing (IP). The latter proceeds as follows.

A data file for interactive printing transmitted via the network by a workstation is received by the DAC. This extracts from the file a number of predetermined identification data, e.g. the name of the owner and the name of the file itself. The file is then stored unchanged in a storage unit, such as a hard disk, in the DAC, whereafter the device passes to the stand-by mode in respect of this job.

The DAC manages an administration system which contains the identification data of all the stored data files for printing. If a new file is sent via the network, then the DAC adds the identification data thereof to the administration system under the name of the owner/sender.

The disk together with the administration system of the DAC form, as it were, a set of "logic storage spaces" for data files, each logic storage space being allocated to one user. Thus storage in the logic storage space of a user in actual fact means that the file is stored on the disk and entered in the administration system under the name of that user. A logic storage space can be protected by a code specific to the owner/user, which means in practice that an operator can only obtain information concerning the files stored in a specific logic storage space after he has input this code via the device operator control panel.

If an operator now wishes to have a specific file printed for interactive printing, then he must select that file by using the operator control panel on the device and giving a print command by pressing a start key. In response to this the data file is brought up from the disk and converted to printable data which are processed by the device to give a print. An interactive print file can be protected by the sender by means of a code. This code is in the form of an attribute to the print file. If the user wishes to have his file printed interactively, then he must key in the security code on the operator control panel in order to have the file printed.

If a data file is printed interactively, then in principle it remains stored on the disk and entered in the administration system until it is removed by the user himself or by the device manager.

The device manager can bring the device into a mode in which automatic print jobs are not accepted. In that case incoming automatic print jobs are converted by the DAC to interactive print jobs and stored on the disk.

As already stated, at least a number of the devices in this system are in fact digital copying machines which can also make a copy of an original document by scanning it and printing the digital image data thus generated.

There are therefore jobs which are started by a user at the device itself (copying and interactive print jobs) and jobs which are passed at a distance, for example from a workstation (PC) (an automatic print job). In the former case the device operates in a command-controlled mode in which the device starts a reproduction process in response to a start command from the operator control panel, and in the second case in an autonomous mode in which the device starts a reproduction process on its own initiative.

A user arriving at the device in order to start a print job there with the keys finds it very frustrating if a remote-started automatic print job begins just before he wishes to start his job. He then has to wait until the remote-started job is finished, or at least interrupt this job with an "interrupt" mechanism, before he can make his copy. This often occurs in practice, particularly on a much used device, and causes annoyance and delays the work.

In order to protect the position of the user at the device as much as possible, the device passes into the command-controlled mode and/or remains therein for a predetermined first waiting time on detection of a physical interaction between an operator and the device. During this waiting time the device cannot pass into the autonomous mode. This gives the user at the device the opportunity of creating time for himself in order to start his job unhurriedly, e.g. by actuating a key or placing one or more documents in the device feed tray.

After completion of the execution of a job in the command-controlled mode, the machine also remains in the command-controlled mode for a predetermined second waiting time.

Thus a user wishing to process more copying or interactive print jobs is not overtaken by an automatic print job. The device cannot pass to the autonomous mode during the second waiting time either. The second waiting time can be equal to the first. A practical waiting time value is, for example, 30 seconds to 2 minutes.

Some aspects of the above-mentioned desktop software will now be described, in which aspects the present invention is applied. It should be noted here that the exemplary implementation described is based on the Microsoft Corporation Windows 95 operating system.

In this operating system, operator control elements such as the mouse have a fixed function, and this is assumed to be known to the reader.

The desktop software includes the following modules:
an overview of all the available connected devices with an indication of their status (hereinafter referred to as Devices Overview)
an overview of current print jobs with the possibility of intervening in the settings for each job (hereinafter referred to as: Job Control)
information provision as to the progress of current print jobs (hereinafter referred to as: Job Monitoring).

The status information presented by the three modules of the desktop software is dynamic, i.e. it is adapted immediately when any change occurs in the presented mode.

The present invention is situated in the "Devices Overview" module and a more detailed description of the other two modules will therefore be omitted here.

The three program modules referred to can be started from a general start menu which appears on selection of the desktop software on the workstation display screen.

Figure 5:
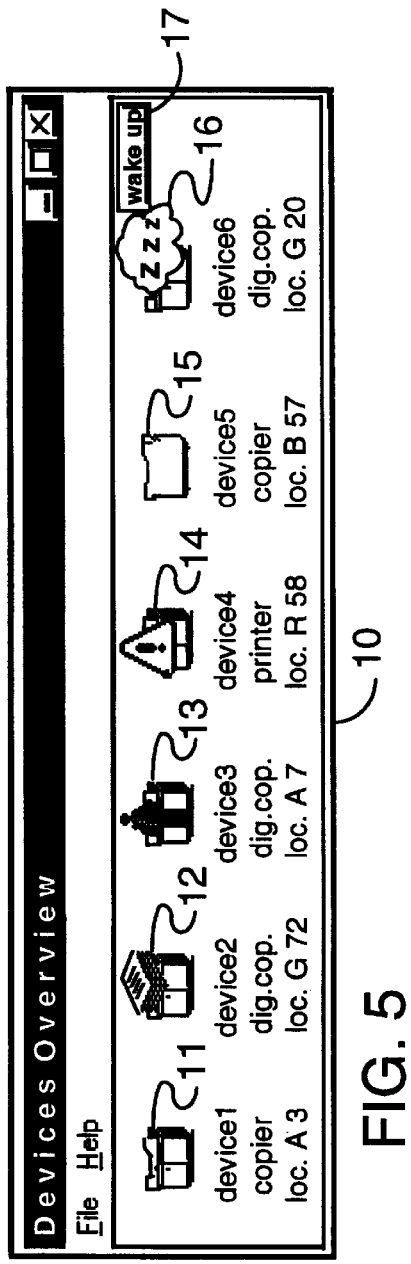
FIGS. 5, 6A, 6B, 6C, 7, 8A, 8B and 9 show various information windows displayed on the workstation monitor screen by the desktop software according to the invention.

FIG. 5 shows a window 10 which is displayed on the workstation display screen after the user has selected the "Devices Overview" option in the desktop software. In this window, there is displayed for each device a symbol which indicates the status of that device. Examples of this are given in FIG. 5. A short description of the device, both the type of device (copier, digital copier, printer) and the place where the device is located, are also given by each symbol. The symbols illustrated are given solely by way of example.

A first symbol 11 is a stylized illustration of the device. This symbol indicates that the device concerned is available for print jobs and is currently not in action. A second symbol 12 shows the device with a stack of papers thereabove and means that this device is busy with an automatic print job in the autonomous mode. Symbol 13 shows the device with a person in front of it, indicating that the device is in the command-controlled mode and is therefore either busy with a copying or interactive print job or in the above-described first or second waiting time mode, in which it cannot start automatic print jobs. Symbol 14 is an illustration of the device with a warning notice superimposed thereon, indicating that this device is malfunctioning. Symbol 15 is an undetailed illustration of the device, showing that although this device is connected it is at the moment not available for copying or print jobs.

Symbol 16 shows the device with a cloud superimposed thereon, indicating that this device is in an energy-saving (sleep) mode, and therefore requires some time before returning to the stand-by mode. An illustration 17 of a key (with the text "wake up") forms part of this symbol. By clicking on this key with the mouse the operator can wake the device up from the sleep mode. The waking mechanism will be described in detail hereinafter.

By reference to these symbols a user can decide on the device to which he is to send his print job, and also (if he does not wish to carry out a copying or interactive print job) whether the device of his choice is free and ready for operation.

The user can select one of the symbols, and hence one of the devices, and then call up one of the following functions either with a menu in the top bar of the window or with a pop-up menu on the right-hand mouse button:

Displaying the waiting print jobs for the device concerned; in this function, automatic and interactive print jobs are shown separately and they can also be manipulated. This function does not form part of the present invention and will therefore not be described in detail.

Displaying the properties and the status of the device in question.

Calling up a monitor function which during the work gives information on the screen as to the status of the device in question.

Defining the device in question as the default printer.

It will be clear that the first and last functions are not available for ordinary copying machines.

Figure 6A:
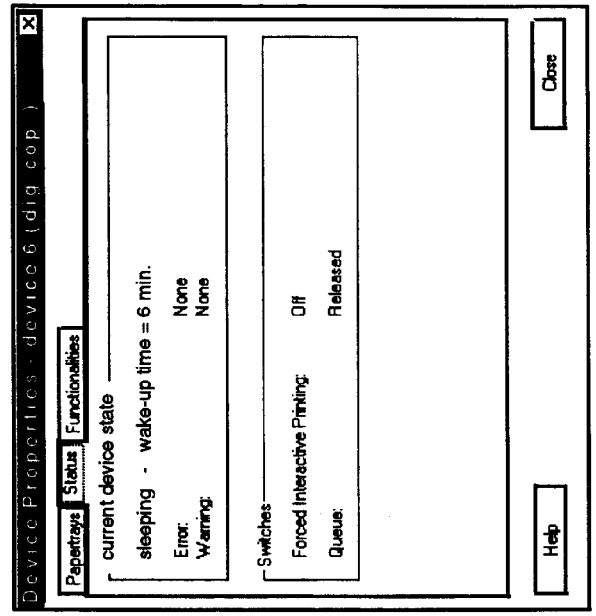
Figure 6B:
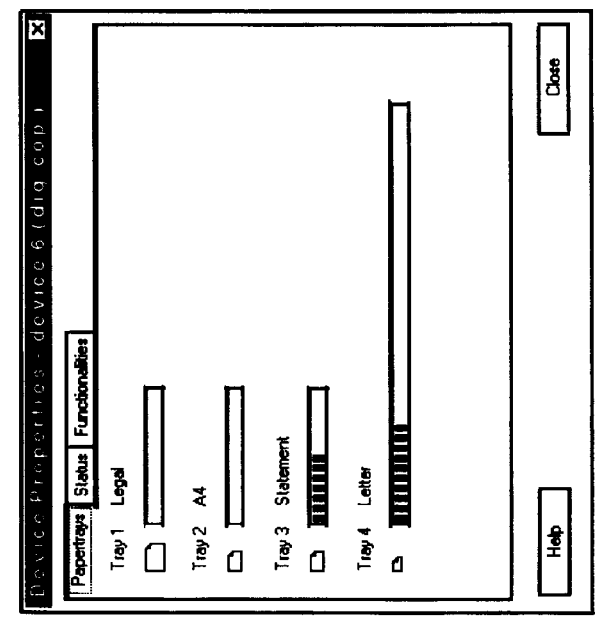

In the above-mentioned function in which the properties and status of the device are displayed, a window with this information appears on the monitor screen, the information being divided over three tab cards which can be made visible by selecting their tab, as shown in FIGS. 6A, B and C. The supply of printing paper in the device trays is shown on a first tab card, the current state of operation of the device is described on the second tab card (if the device is in an energy-saving mode the time required to bring the apparatus back to stand-by mode is also shown as illustrated in FIG. 6B), while the third tab card gives information as to the installed functionality.

Figure 7:
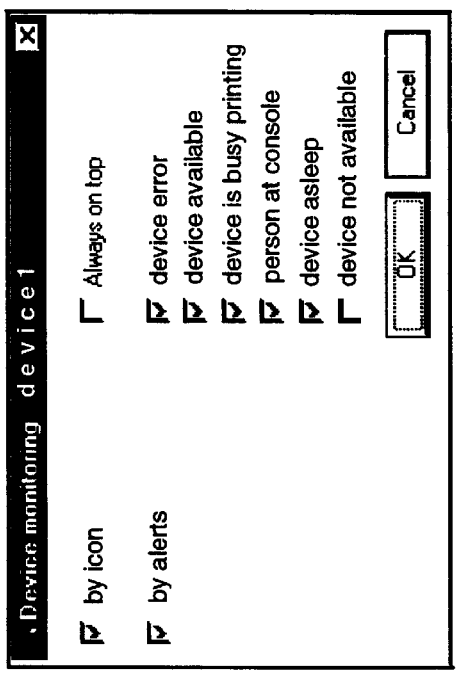

In response to the selection of the above-mentioned monitor function, the workstation screen shows a window in which the user can set his preferences for the form of presentation of the status data of the device (see FIG. 7). There are two main forms of presentation, namely with a permanent icon on the screen ("by icon") and by messages which appear on the screen at the time a change of mode of the device occurs ("by alerts").

If monitoring by icons is set, the icon displays a symbolic illustration of the status just as shown in FIG. 5. An example of an icon of this kind is given in FIG. 8A. It contains the mode symbol of FIG. 5, a description of the device, and a description of the mode. If the device is in a sleep mode, a key 20 for waking the device up from the sleep mode and the time required for the device to return to stand-by are also shown.

Figure 8B:
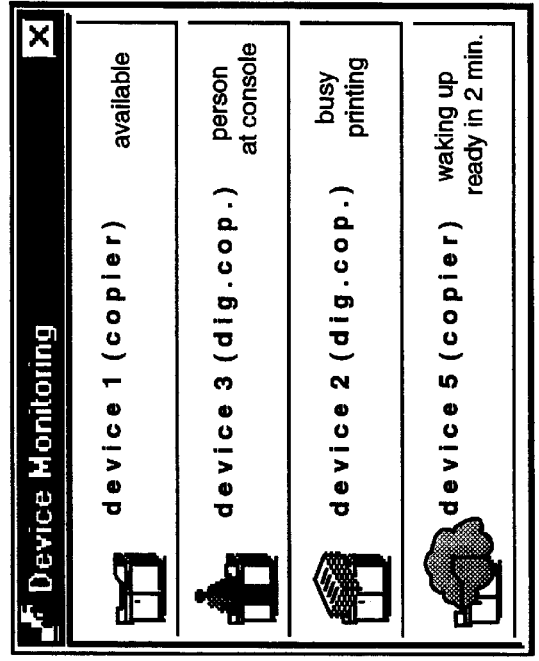
Figure 6C:
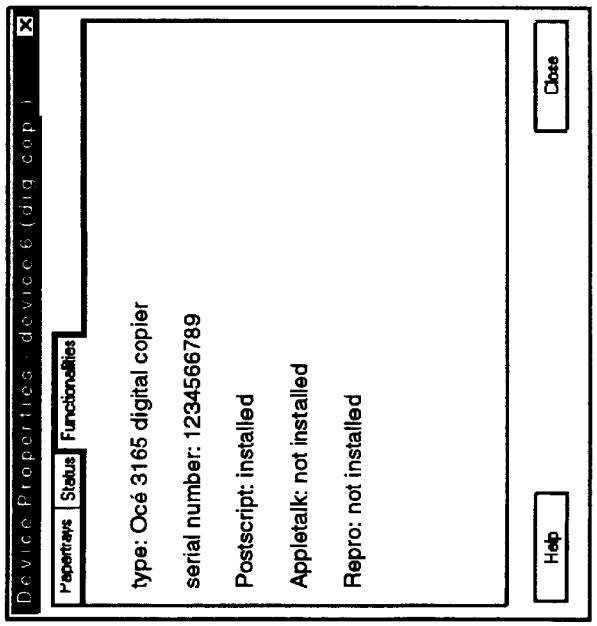

A user can also have the status of various devices updated simultaneously. In that case, an icon is displayed on the screen for each monitored device as shown in FIG. 8B.

Figure 9:
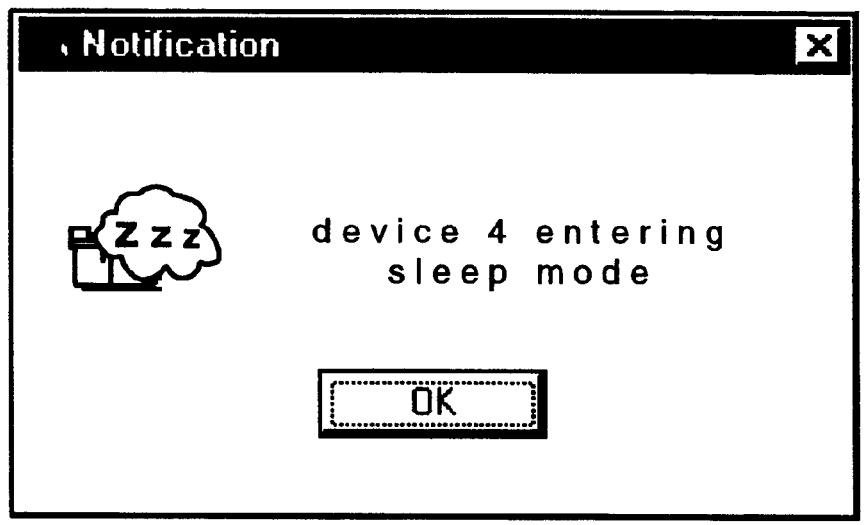

In the case of monitoring by alerts, the user can input the mode changes for which he wishes to receive a message in order thus to avoid unnecessary messages (see FIG. 7). An example of such a message is shown in FIG. 9.

Figure 10:
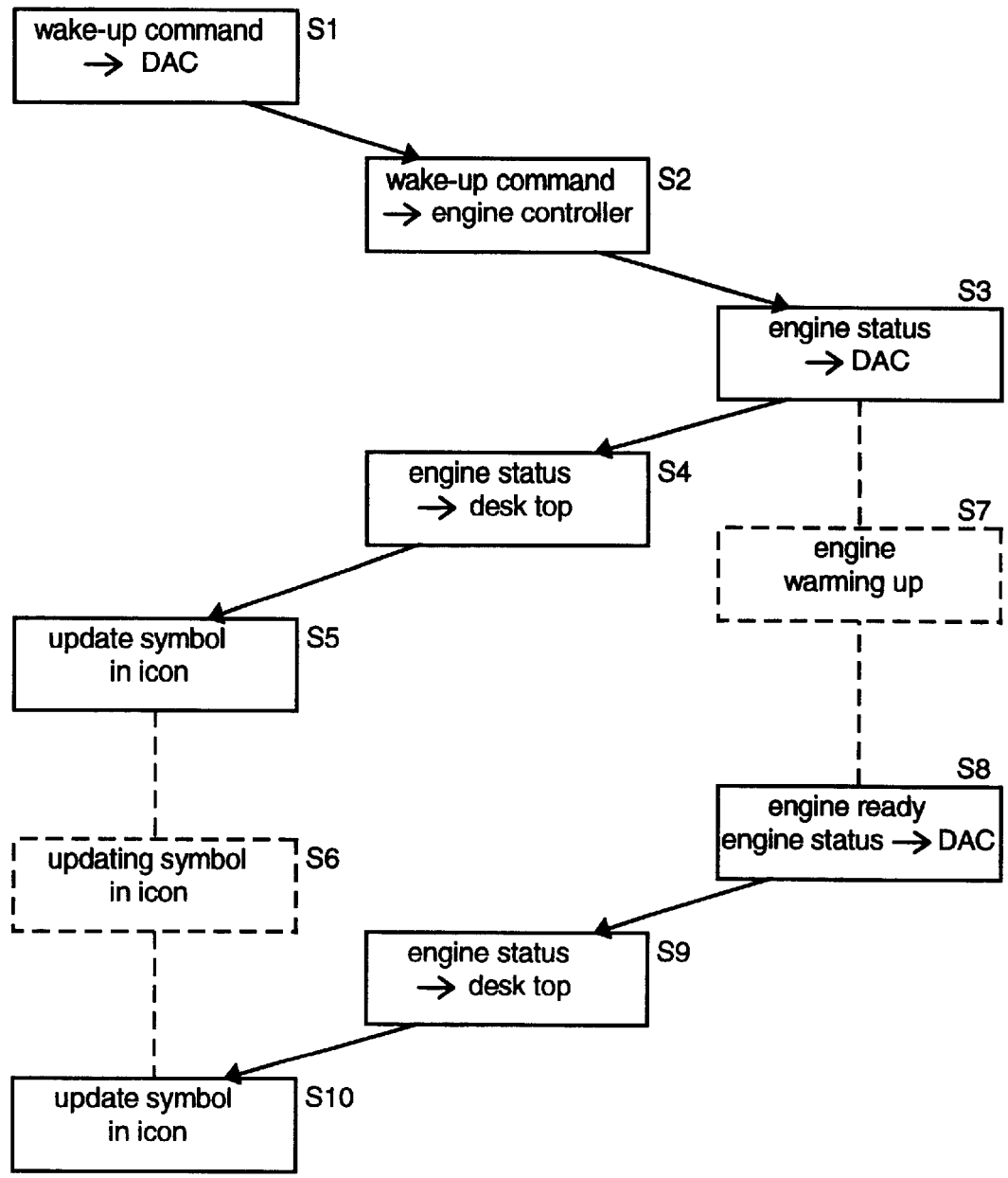
FIG. 10 is a diagram showing the course of events after a wake-up command has been given.

FIG. 10 shows the course of events after a user has actuated one of the wake-up keys 17 or 20.

In response to actuation of a wake-up key 17 or 20 (S1), the desktop software sends a wake-up command to the DAC, which passes it to the engine controller (S2). In response to this the latter checks the mode of the engine (S3). This can be (with reference to FIG. 3): ready for operation ("stand-by" and "printing jobs" modes), warming-up and energy conservation mode (first and second sleep mode).

If the engine is in an energy-saving mode, the engine controller starts by returning the engine to the stand-by mode. The engine controller also passes the mode of the engine to the DAC, together, if applicable, with an estimated time required to restore the stand-by mode (S4).

Figure 8A:

This period of time is established on the basis of the measured temperature of the fixing unit. The DAC transmits these data to the desktop, which adapts the symbol on the monitor screen for the device in question (S5). In the monitor function, in which an icon is displayed on the screen for the device in question, the period of time is now also displayed, and this is counted off dynamically by the desktop (S6). Also, during the warming-up of the device (S7), an adapted symbol is displayed as shown at the bottom of FIG. 8B to indicate that the engine is warming up. In this example, the symbol is an image of the device with a transparent grey cloud superimposed thereabove. In would also be possible for the symbol to contain a cloud as shown in FIG. 8A, the cloud decreasing in size as the warming-up time progresses.

When the engine is again ready for operation, the engine controller transmits a corresponding signal to the DAC (S8), which in turn passes it to the desktop (S9). The desktop now adapts (S10) the symbol for the device in question in the monitor icon (FIG. 8A/B) and/or in the devices overview window (FIG. 5) to the new engine mode (substitution of the symbol by the symbol indicated by reference 11 in FIG. 5).

In this way, the user of the system is continually informed of the state of the connected devices. If a device is in an energy-saving mode, so that it is not immediately available for a copying or print job, the user can already awaken the device from this mode from his workstation. He will then receive a message when the device is again ready for operation and he can proceed to the device for a copying or interactive print job. In this way he does not have to wait at the device for it to warm up and for any re-initialization of the device.

This invention is also convenient for automatic print jobs (which do not need to be started at the device itself), because if a user knows that he soon wants to have a print job carried out quickly, he can take care beforehand to ensure that the device is ready for operation.

Figure 3:
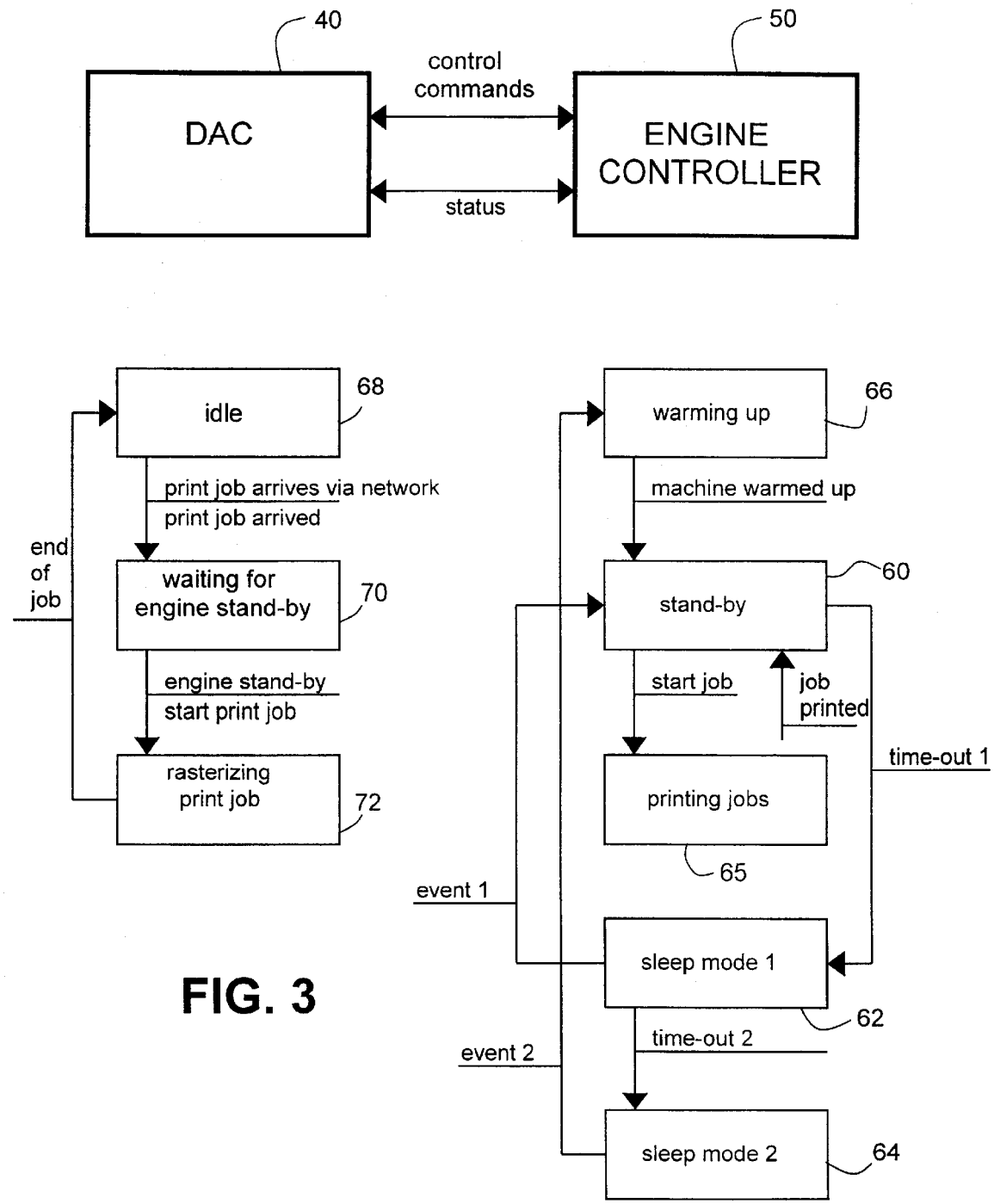
FIG. 3 shows a mode diagram for energy-conservation steps.

With the same mechanisms as described above it is also possible to bring devices to an energy-saving mode from a workstation without waiting for the normal waiting period ("time-out 1" and/or "time-out 2" in FIG. 3).

Referring to FIG. 5, the menu in the top bar of the "Devices Overview" window or the pop-up menu on the right-hand mouse button contains an entry for bringing the selected device into the energy-saving mode. In response to selection of this entry the desktop software transmits a command to this effect to the DAC of the selected device, which then transmits this command to its engine controller, which latter then brings the engine into a sleep mode. The command can be differentiated as to the first or second sleep mode, but it also appears rational to make only the second and most effective sleep mode selectable.

This possibility of bringing a device into an energy-saving mode could be made available to all users, but it would probably be better to reserve this function for a privileged user or key operator.

With this embodiment it is also possible to bring an entire group of devices into the energy-saving mode from a central point, e.g. at the end of the working hours in a company. As a further alternative, the invention can be used to wake up a group of devices centrally.

An alternative form of the wake-up command gives an operator the opportunity to wake up a remote device at a certain moment. In reaction to clicking of the wake up key 17 or 20 (FIG. 5 or 8A), a menu is shown having two fields, one specifying "now" and the other "not now". When the operator clicks in the "now" field, the wake up procedure, as described above in connection with FIG. 10, is entered immediately. When the operator clicks in the "not now" field, he is presented with a selection window in which he can select any of a relative or absolute time for starting the wake-up procedure. In the relative time mode, the operator can select a time period, after which the wake-up procedure is to be entered, e.g., "wake-up in 10 minutes from now". In the absolute mode, the operator can specify a time at which the wake-up procedure is to be entered. e.g. "wake-up at 10:00 am".

In both modes, the desk top software transmits the required wake-up time to the DAC, which starts the wake-up procedure at that time.

In a more sophisticated embodiment, the operator can specify the desired time or time interval at which he wants the device to be ready. In that case, the DAC calculates the extra time necessary for waking up the device and starts the wake up procedure correspondingly earlier.

This delayed wake-up command can also be advantageously combined with the command to bring a device into the energy-saving mode. As described above, a device can be put to sleep by opening a pop-up menu in the top bar of the window in FIG. 5 and clicking of the "energy-saving mode" field. In a further embodiment, this pop-up menu also contains a field for "temporary energy-saving". When the operator clicks on this field, he is presented with the window in which he can specify the desired wake-up, as described above. The energy-saving mode is then entered for the specified period.

Although the invention has been explained by reference to the above-described embodiment, it is not restricted thereto. Other embodiments within the scope of the accompanying claims will be apparent to the skilled man, and these are considered as coming under the scope of protection of this patent. For example, the devices could be constructed with just one energy-saving mode, and, on the other hand, in the case of two or even more energy saving modes, indication thereof by the desktop software could be differentiated by different symbols for the different modes.

Also, the function of the displayed keys on the screen, for entering a sleep mode, could be given to a physical key on the workstation keyboard.

The invention being thus described, it will be obvious that the same may be varied in many ways. Such variations are not to be regarded as departure from the spirit and scope of the invention, and all such modifications as would as would be obvious to one skilled in the art are intended to be included within the scope of the following claims.

What is claimed is:

1. A system of at least one workstation and an image reproduction device connected thereto by a digital network, the workstation having a processor unit, a display screen, and an operator control device, said image reproduction device having an automatic system for bringing said image reproduction device into an energy conservation mode, which energy conservation mode differs from a normal operating mode for making prints on image supports, the system comprising:

said workstation further provided with a control program for communication with said image reproduction device;

said control program calling up or receiving information from said image reproduction device concerning a status of said image reproduction device;

said control program displaying current status information concerning said image reproduction device on the workstation display screen;

said control program provided with means for detecting that said image reproduction device is in an energy conservation mode; and said control program adapted to display whether said image reproduction device is in the energy conservation mode on the workstation display screen, wherein said control program in the workstation is provided with means for determining how long it will take to bring said image reproduction device back to the normal operating mode from an energy conservation mode in which it is at that time, and wherein said control program is adapted to display information from said determining means on the workstation display screen.

2. The system according to claim 1,
wherein said control program in the workstation is also provided with:
  means for returning said image reproduction device into the normal operating mode when said image reproduction device is in the energy conservation mode; and
  means for receiving, from the workstation operator control device, a command for returning said image reproduction device to the normal operating mode.

3. The system according to claim 2,
wherein said receiving means is adapted to receive a command for immediately returning said image reproduction device into the normal operating mode.

4. The system according to claim 2,
wherein said receiving means is adapted to receive a command for returning said image reproduction device into the normal operating mode at a time selected by an operator at the workstation operator control device.

5. The system according to claim 4,
wherein the time is selectable in the form of a relative time or an absolute time.

6. The system according to claim 2,
wherein said receiving means for receiving a command includes an image of a key on the workstation display screen.

7. The system according to claim 1,
wherein said control program in the workstation is provided with means for displaying in the form of a symbolic image or icon the status information including the fact of being in an energy conservation mode.

8. The system according to claim 1,
wherein said control program in the workstation is also provided with:
  means for causing said image reproduction device to pass into the energy conservation mode when said image reproduction device is in the normal operating mode; and
  means for receiving, from the workstation operator control device, a command for causing said image reproduction device to pass into the energy conservation mode.

9. The system according to claim 1,
wherein said image reproduction device is a printer for printing print files sent to the printer via said digital network.

10. The system according to claim 1, further comprising a plurality of said image reproduction devices including copying machines and printers.

11. A method of controlling a system of at least one workstation and an image reproduction device connected thereto by a digital network, the workstation having a processor unit, a display screen, and an operator control device, the image reproduction device having an automatic system for bringing the image reproduction device into an energy conservation mode, which energy conservation mode differs from a normal operating mode for making prints on image supports, the method comprising:
  calling up or receiving from the image reproduction device information concerning a current status of the image reproduction device;
  displaying the current status information concerning the image reproduction device on the workstation display screen;
  detecting that the image reproduction device is in the energy conservation mode;
  displaying information indicating that the image reproduction device is in the energy conservation mode on the workstation monitor screen if said detecting step detects that the image reproduction device is in the energy conservation mode;
  determining how long it will take to bring the image reproduction device back to the normal operating mode from an energy conservation mode in which the image reproduction device is at that moment; and
  displaying information from said determining step on the workstation display screen.

12. The method according to claim 11, further comprising:
  receiving, from the workstation operator control device, a command for returning an image reproduction device which is in the said energy conservation mode to the normal operating mode; and
  initiating the energy conservation mode by sending to the image reproduction device a command to that effect.

13. The method according to claim 12,
wherein said receiving step is adapted to receive a command for immediately returning the image reproduction device into the normal operating mode.

14. The method according to claim 12,
wherein said receiving step is adapted to receive a command for returning the image reproduction device into the normal operating mode at a time selected by an operator at the workstation operator control device.

15. The method according to claim 14,
wherein the time is selected in the form of a relative time or an absolute time.

16. The method according to claim 11, further comprising:
  receiving, from the workstation operator control device, a command for bringing an image reproduction device which is in the normal operating mode into the energy conservation mode; and
  initiating the energy conservation mode by sending to the image reproduction device a command to that effect.

17. The method according to claim 11,
wherein the image reproduction device is a copying machine.

18. The method according to claim 11,
wherein the image reproduction device is a printer for printing print files sent to the printer via the digital network.

19. An article of manufacture, comprising:
a computer-usable medium including computer-readable program code means, embodied therein, for controlling a system of at least one workstation and an image reproduction device connected thereto by a digital network, the workstation having a processor unit, a display screen, and an operator control device, the image reproduction device having an automatic system for bringing the image reproduction device into an energy conservation mode, which energy conservation mode differs from a normal operating mode for making prints on image supports, the computer-readable program code means comprising:
  computer-readable program code means for calling up or receiving from the image reproduction device information concerning a current status of the image reproduction device;
  computer-readable program code means for displaying the current status information concerning the image reproduction device on the workstation display screen;

computer-readable program code means for detecting that the image reproduction device is in an energy conservation mode;

computer-readable program code means for displaying information indicating that the image reproduction device is in the energy conservation mode on the workstation monitor screen if said detecting means detects that the image reproduction device is in the energy conservation mode;

computer-readable program code means for determining how long it will take to bring the image reproduction device back to the normal operating mode from an energy conservation mode in which the image reproduction device is at that moment; and computer-readable program code means for displaying information from said determining means on the workstation display screen.

20. The article of manufacture according to claim 19, further comprising:

computer-readable program code means for receiving, from the workstation operator control device, a command for returning an image reproduction device which is in the said energy conservation mode to the normal operating mode; and computer-readable program code means for initiating the energy conservation mode by sending to the image reproduction device a command to that effect.

21. The article of manufacture according to claim 20, wherein said receiving means includes computer-readable program code means for receiving a command for immediately returning the image reproduction device into the normal operating mode.

22. The article of manufacture according to claim 20, wherein said receiving means includes computer-readable program code means for receiving a command for returning the image reproduction device into the normal operating mode at a time selected by an operator at the workstation operator control device.

23. The article of manufacture according to claim 22, wherein the time is selected in the form of a relative time or an absolute time.

24. The article of manufacture according to claim 19, further comprising:

computer-readable program code means for receiving, from the workstation operator control device, a command for bringing an image reproduction device which is in the normal operating mode into the energy conservation mode; and computer-readable program code means for initiating the energy conservation mode by sending to the image reproduction device a command to that effect.

25. A system of at least one workstation and a copying machine connected thereto by a digital network, the workstation having a processor unit, a display screen, and an operator control device, said copying machine having an automatic system for bringing said copying machine into an energy conservation mode, which energy conservation mode differs from a normal operating mode for making prints on image supports, the system comprising:

said workstation further provided with a control program for communication with said copying machine;

said control program calling up or receiving information from said copying machine concerning a status of said copying machine;

said control program displaying current status information concerning said copying machine on the workstation display screen;

said control program provided with means for detecting that said copying machine is in an energy conservation mode; and said control program adapted to display whether said copying machine is in the energy conservation mode on the workstation display screen;

wherein said control program in the workstation is provided with means for determining how long it will take to bring said copying machine back to the normal operating mode from an energy conservation mode in which it is at that time; and wherein said control program is adapted to display information from said determining means on the workstation display screen.

26. The system according to claim 25, wherein said control program in the workstation is also provided with:

means for returning said copying machine into the normal operating mode when said copying machine is in the energy conservation mode; and means for receiving, from the workstation operator control device, a command for returning said copying machine to the normal operating mode.

27. The system according to claim 26, wherein said receiving means is adapted to receive a command for immediately returning said copying machine into the normal operating mode.

28. The system according to claim 26, wherein said receiving means is adapted to receive a command for returning said copying machine into the normal operating mode at a time selected by an operator at the workstation operator control device.

29. The system according to claim 25, wherein said control program in the workstation is provided with means for displaying in the form of a symbolic image or icon the status information including the fact of being in an energy conservation mode.

30. The system according to claim 25, wherein said control program in the workstation is also provided with:

means for causing said copying machine to pass into the energy conservation mode when said copying machine is in the normal operating mode; and means for receiving, from the workstation operator control device, a command for causing said copying machine to pass into the energy conservation mode.

31. A system of at least one workstation and an image reproduction device connected thereto by a digital network, the workstation having a processor unit, a display screen, and an operator control device, said image reproduction device having an automatic system for bringing said image reproduction device into an energy conservation mode, which energy conservation mode differs from a normal operating mode for making prints on image supports, the system comprising:

said workstation further provided with a control program for communication with said image reproduction device;

said control program calling up or receiving information from said image reproduction device concerning a status of said image reproduction device;

said control program displaying current status information concerning said image reproduction device on the workstation display screen;

said control program provided with means for detecting that said image reproduction device is in an energy conservation mode; and said control program adapted to display whether said image reproduction device is in the energy conservation mode on the workstation display screen, wherein said control program in the workstation is also provided with:

receiving means for receiving, from the workstation operator control device, a command for returning said image reproduction device to the normal operating mode, said command excluding a print request; and wake-up means for returning said image reproduction device to the normal operating mode in response to said command, wherein said control program in the workstation is provided with means for determining continuously, after a start has been made in returning said image reproduction device to the normal operating mode, how long such return will take, and wherein said control program is adapted to dynamically display information from said determining means on the workstation display screen.

32. A method of controlling a system of at least one workstation and an image reproduction device connected thereto by a digital network, the workstation having a processor unit, a display screen, and an operator control device, the image reproduction device having an automatic system for bringing the image reproduction device into an energy conservation mode, which energy conservation mode differs from a normal operating mode for making prints on image supports, the method comprising:

calling up or receiving from the image reproduction device information concerning a current status of the image reproduction device;

displaying the current status information concerning the image reproduction device on the workstation display screen;

detecting that the image reproduction device is in the energy conservation mode;

displaying information indicating that the image reproduction device is in the energy conservation mode on the workstation monitor screen if said detecting step detects that the image reproduction device is in the energy conservation mode, receiving, from the workstation operator control device, a command for returning the image reproduction device which is in the energy conservation mode to the normal operating mode, said command excluding a print request;

returning the image reproduction device to the normal operating mode in response to said command;

continuously determining, after a start has been made to return the image reproduction device to the normal operating mode, how long such return will take; and dynamically displaying information from said continuously determining step on the workstation display screen.

33. An article of manufacture, comprising:

a computer-usable medium including computer-readable program code means, embodied therein, for controlling a system of at least one workstation and an image reproduction device connected thereto by a digital network, the workstation having a processor unit, a display screen, and an operator control device, the image reproduction device having an automatic system for bringing the image reproduction device into an energy conservation mode, which energy conservation mode differs from a normal operating mode for making prints on image supports, the computer-readable program code means comprising:

computer-readable program code means for calling up or receiving from the image reproduction device information concerning a current status of the image reproduction device;

computer-readable program code means for displaying the current status information concerning the image reproduction device on the workstation display screen;

computer-readable program code means for detecting that the image reproduction device is in an energy conservation mode;

computer-readable program code means for displaying information indicating that the image reproduction device is in the energy conservation mode on the workstation monitor screen if said detecting means detects that the image reproduction device is in the energy conservation mode;

computer-readable program code means for receiving, from the workstation operator control device, a command for returning the image reproduction device which is in the energy conservation mode to the normal operating mode, said command excluding a print request;

computer-readable program code means for returning the image reproduction device to the normal operating mode in response to said command;

computer-readable program code means for continuously determining, after a start has been made to return the image reproduction device to the normal operating mode, how long such return will take; and computer-readable program code means for dynamically displaying information from said continuously determining means on the workstation display screen.

34. A system of at least one workstation and a copying machine connected thereto by a digital network, the workstation having a processor unit, a display screen, and an operator control device, said copying machine having an automatic system for bringing said copying machine into an energy conservation mode, which energy conservation mode differs from a normal operating mode for making prints on image supports, the system comprising:

said workstation further provided with a control program for communication with said copying machine;

said control program calling up or receiving information from said copying machine concerning a status of said copying machine;

said control program displaying current status information concerning said copying machine on the workstation display screen;

said control program provided with means for detecting that said copying machine is in an energy conservation mode; and said control program adapted to display whether said copying machine is in the energy conservation mode on the workstation display screen;

wherein said control program in the workstation is also provided with:
  receiving means for receiving, from the workstation operator control device, a command for returning said copying machine to the normal operating mode, said command excluding a print request; and
  wake-up means for returning said copying machine to the normal operating mode in response to said command, wherein said control program in the workstation is provided with means for determining continuously, after a start has been made in returning said copying machine to the normal operating mode, how long such return will take, and wherein said control program is adapted to dynamically display information from said determining means on the workstation display screen.

* * * * *